Oct. 15, 1935.  M. G. CLAY  2,017,203

FILM GATE

Filed Sept. 5, 1931  2 Sheets-Sheet 1

INVENTOR
MURRAY G. CLAY
BY
ATTORNEY

Oct. 15, 1935. M. G. CLAY 2,017,203
FILM GATE
Filed Sept. 5, 1931 2 Sheets-Sheet 2

INVENTOR
MURRAY G. CLAY
BY
ATTORNEY

Patented Oct. 15, 1935

2,017,203

UNITED STATES PATENT OFFICE 2,017,203

FILM GATE

Murray G. Clay, New York, N. Y., assignor to Radio Corporation of America, a corporation of Delaware Application September 5, 1931, Serial No. 561,327

1 Claim. (Cl. 88—17)

This invention relates to film gates such are are used in motion picture apparatus and more particularly the variety thereof which are used in soundheads of combined motion picture machines and film sound reproducers, but it is to be understood that it is not limited to such sound gates as the invention is likewise applicable to picture gates.

One object of the invention is to provide a simple, rugged, and inexpensive film gate.

Another object of the invention is to provide an improved film gate which avoids the use of the usual pressure shoes which are forced against the film by compression, and substitute the use of shoes which are held against the film by longitudinal tension.

Another object of the invention is to provide improved means for readily adjusting the tension upon said shoes.

Another object of the invention is to provide such a gate having shoes of such design that the pressure will be properly distributed over the area of the gate in order that the film may be drawn thereover without any flutter.

Another object of the invention is to provide improved means for independently adjusting the said pressure shoes.

Another object of the invention is to provide such a construction which permits the gate to be opened as far as possible within a relatively limited space to permit cleaning of the gate and easy insertion of the film.

Another object of the invention is to provide such a gate wherein both the top and bottom of the gate open equal distances.

Another object of the invention is to provide such a gate including side guide mechanism and a bottom guide roller in the most compact location.

Another object of the invention is to provide such a gate wherein substantially all parts of the gate can be made by stamping.

Another object of the invention is to provide such a gate with a locking mechanism capable of easily operating and accurately locking the gate in closed position.

Figure 1:
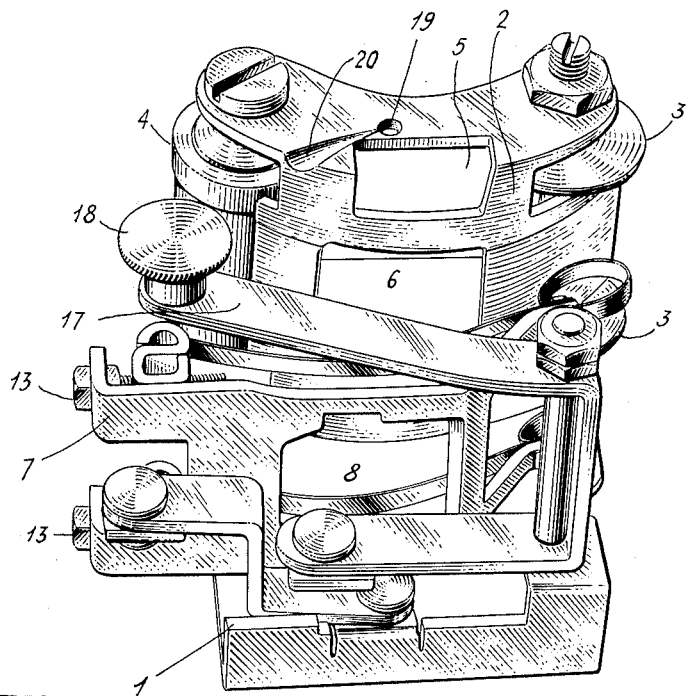
Fig. 1 is a side view of the gate, open, looking toward the aperture plate from the operating side of the gate.
Figure 3:
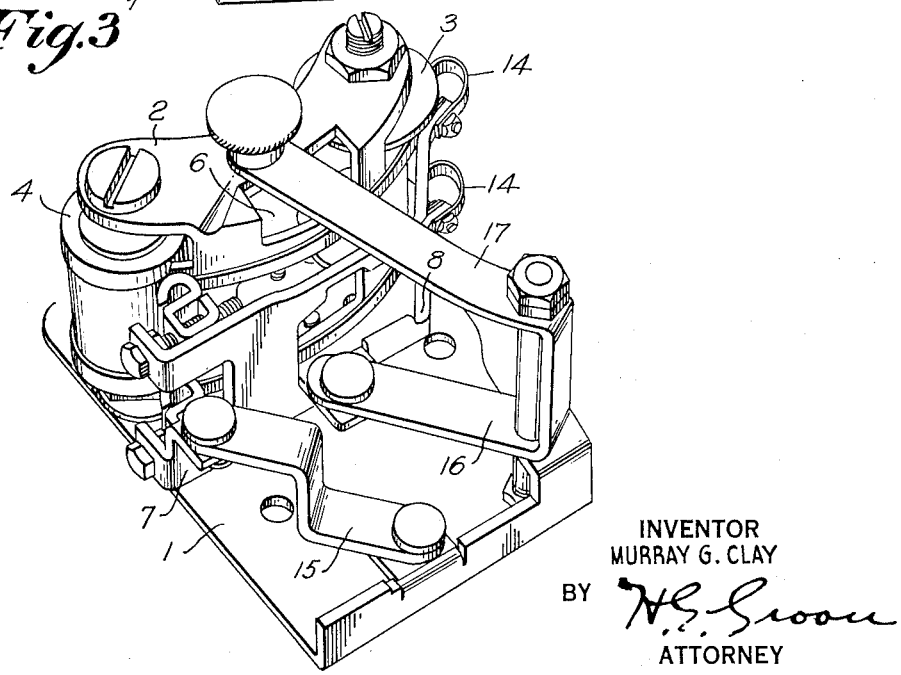
Fig. 3 is a view corresponding generally to Fig. 1 but showing the gate in closed position.
Figure 2:
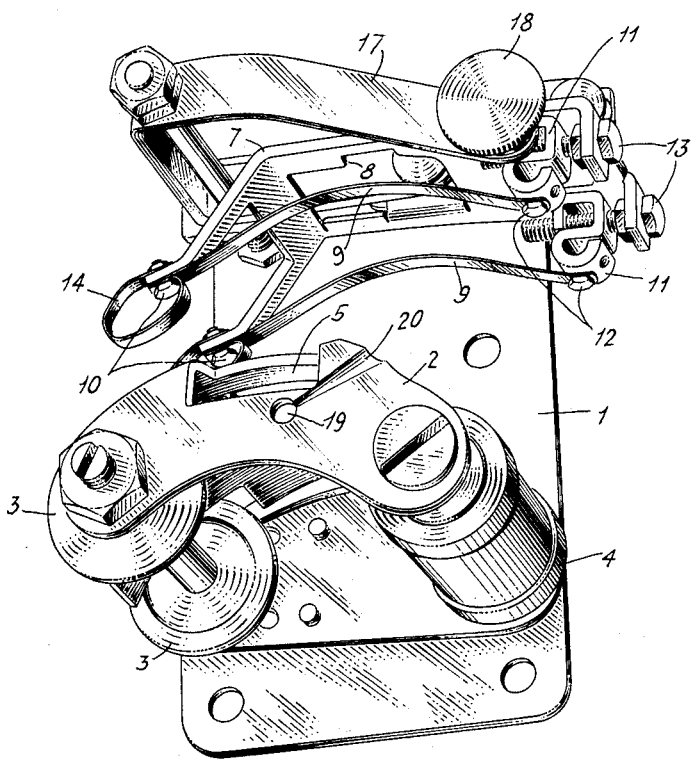
Fig. 2 is a view of the gate looking away from the aperture gate and toward the pressure shoes from underneath.

The gate consists of a base plate or equivalent member 1 which, of course, may be formed from one of the members of the machine to which the gate is attached. Upon this is mounted the aperture plate 2 which as shown is in the form of a single stamping attached to the base member 1 and with the sides bent back to carry the bearing members for the side guides and rolls; the side guides being shown at 3 and the lower guide roll at 4.

These two guide rolls, as will be apparent from the drawings, are conventional in design, but the aperture plate is curved convexly toward the film, and these members 3 and 4 are mounted on the concave side of the gate so as to take up the least possible amount of room. The gate is, of course, provided with the usual apertures 5 and 6.

Movable toward and away from the aperture plate 2 is a frame member 7 which is likewise formed from a single stamping and is provided with an appropriate aperture 8. This frame member carries the two tension shoes 9 which are adapted to cooperate with the central portion of the aperture plate. These tension shoes are held to the frame member by the screws 10 and are held to the adjusting blocks 11 by the screws 12. The adjusting blocks being movable by means of the screws 13 in order to vary the tension upon the shoes 9.

The screws 10 also hold the pressure shoes 14 which are made in the form of loops and serve to maintain the film substantially in contact with the aperture plate 2 where it passes between the guide rolls 3. This pair of shoes 14 is provided with a slight clearance,—say about .002 inch,—in order that they may not tend to cause any friction with or vibration of the film.

The frame member 7 is supported by and moved toward and away from the aperture plate 2 by a parallel link mechanism.

This mechanism consists of two links 15 and 16. It will be noted that the length of link 15 is very slightly greater than that of the link 16 in order that the bottom of the pressure plate may be retracted as far as possible, since there is nothing to interfere with at the bottom as there is at the top. The top link 16 is continued in the form of the arm 17 which constitutes an operating handle and this operating handle is provided with a knob 18 which is provided at the opposite side of the arm 17 with a pin adapted to fall into the hole 19 in the member 2. A groove 20 is provided in the mmber 2 to guide this pin toward the hole without necessitating the lifting of the arm to permit closing of the gate. When the handle 18 is merely pushed toward a closed position, the pin referred to will slide upon the groove 20 and drop into the hole 19 thereby securely locking the gate in closed position.

I claim:

A film gate comprising an aperture plate and a movable pressure plate, and unitary means constituting a supporting link mechanism, operating mechanism, and locking means for actuating said movable pressure plate.

MURRAY G. CLAY.